(12) United States Patent
Zhang et al.

(10) Patent No.: US 11,423,714 B2
(45) Date of Patent: Aug. 23, 2022

(54) METHOD AND DEVICE FOR MANAGING TIRE DATA

(71) Applicant: HAMATON AUTOMOTIVE TECHNOLOGY CO., LTD, Zhejiang (CN)

(72) Inventors: Jack Zhang, Zhejiang (CN); Yue Wang, Zhejiang (CN)

(73) Assignee: HAMATON AUTOMOTIVE TECHNOLOGY CO., LTD, Zhejiang (CN)

( * ) Notice: Subject to any disclaimer, the term of this patent is extended or adjusted under 35 U.S.C. 154(b) by 348 days.

(21) Appl. No.: 16/625,545

(22) PCT Filed: Jun. 20, 2017

(86) PCT No.: PCT/CN2017/089236
§ 371 (c)(1),
(2) Date: Dec. 20, 2019

(87) PCT Pub. No.: WO2018/232610
PCT Pub. Date: Dec. 27, 2018

(65) Prior Publication Data
US 2021/0407226 A1 Dec. 30, 2021

(51) Int. Cl.
*G07C 5/08* (2006.01)
*G07C 5/00* (2006.01)
(52) U.S. Cl.
CPC .......... *G07C 5/0808* (2013.01); *G07C 5/008* (2013.01)

(58) Field of Classification Search
CPC ...... G07C 5/0808; G07C 5/008; G06Q 10/20; G06Q 10/0631; G06Q 10/06
See application file for complete search history.

(56) References Cited

U.S. PATENT DOCUMENTS 9,878,721 B2 * 1/2018 Singh .................. B60C 23/0486

FOREIGN PATENT DOCUMENTS

| CN | 203157617 U | 8/2013 |
|---|---|---|
| CN | 203267677 U | 11/2013 |
| CN | 104816597 A | 8/2015 |
| CN | 104842721 A | 8/2015 |
| CN | 104965434 A | 10/2015 |

(Continued)

OTHER PUBLICATIONS

International Search Report Issued by ISA for PCT International Application No. PCT/CN2017/089236 dated Mar. 19, 2018.

(Continued)

*Primary Examiner* — Michael V Kerrigan
(74) *Attorney, Agent, or Firm* — IP & T Group LLP

(57) ABSTRACT

A method and device for managing tire data. The method includes: after receiving a tire identification reported by a data sending module, a data interaction module or a data monitoring module, and tire usage data of a tire corresponding to the tire identification, correspondingly storing the tire usage data and the tire identification so that the corresponding identification information and the tire usage data can be quickly and efficiently found when a user calls these usage data. The unified management of the related data of the tire provides a data support for the big-data analysis of the tire based on these data, and also enables the unified management of multiple tires and multiple vehicles.

11 Claims, 8 Drawing Sheets

(56) References Cited

FOREIGN PATENT DOCUMENTS

| | | |
|---|---|---|
| CN | 105150775 A | 12/2015 |
| CN | 105787618 A | 7/2016 |
| CN | 106156964 A | 11/2016 |

OTHER PUBLICATIONS

Search Report Issued by Chinese Patent Office dated Nov. 7, 2018.
Office Action issued by Chinese Patent Office dated Nov. 16, 2018.

* cited by examiner

METHOD AND DEVICE FOR MANAGING TIRE DATA

This application is a national stage application of PCT/CN2017/089236 filed on Jun. 20, 2017. The disclosure of each of the foregoing applications is incorporated herein by reference in its entirety.

FIELD OF TECHNOLOGY

The present application relates to the field of vehicle management technologies, and in particular to a method and device for managing tire data.

BACKGROUND

As the most important vehicle part for the safety and energy saving in vehicle transportation, it is of great significance for the reduction in traffic accidents and the research and development on tire to monitor and record the entire process of the tires from production, warehouse management, sales, use, maintenance, retreading to scrapping. For example, for a large transportation fleet and a bus system, since the direct cost of fuel and tires has reached up to 53%, once a tire burst accident occurs, the potential cost will be very high. At present, on the one hand, bar codes, two-dimensional codes, and RFD chips embedded in a tire are used as the tire identification to monitor the state of the tire; on the other hand, a tire pressure monitoring system is mainly used to collect and display the temperature and pressure inside a tire in real time so as to monitor the abnormal situations of the tire.

In the process of implementing the embodiments of the present disclosure, the inventors found that the existing functional modules for identifying the tires, monitoring the pressure and temperature during the use of the tires, and detecting the tread wear of the tires are independent of each other, which is not convenient to analyze the tires by combining the data from various aspects. On the other hand, the monitoring data of tires of various vehicles is independent of each other, which is not convenient for the big-data analysis of the related data of vehicles, or the unified management of a plurality of vehicles.

SUMMARY

The technical problems to be solved by the present disclosure are how to solve the existing difficulties in analyzing tires in combination with data from various aspects of the tires, and in performing the big-data analysis on the tires of the vehicles in conjunction with the monitoring data of tires of various vehicles, or how to manage a plurality of vehicles as a whole.

In view of the technical problems above, the embodiment of the present disclosure provides a method for managing tire data, comprising: receiving identification information for identifying a tire and tire usage data of the tire; and establishing and storing a mapping relation between the identification information and the tire usage data; wherein the tire usage data includes a tire pressure, a tire temperature, and an accumulated driving mileage of the tire.

In an embodiment of the present disclosure, the method further includes: receiving tire circulating records of the tire, establishing and storing a mapping relation between the identification information and the tire circulating records; wherein the tire circulating records include warehousing information, requisition information, installation information, repair records, inspection and maintenance information, retreading records, and scrapping records of the tire.

In an embodiment of the present disclosure, the method further includes: receiving vehicle information of a vehicle to which the tire belongs, establishing and storing a mapping relation between the identification information and the vehicle information; wherein the vehicle information includes a model of the vehicle, a license plate number, personal information of the owner, fleet information of the fleet to which the vehicle belongs, and information regarding an installation position of the tire on the vehicle; the fleet information comprises a name of the fleet.

In an embodiment of the present disclosure, the method further includes: receiving the identification information and an instruction for querying tire information of the tire corresponding to the identification information; and sending the tire information having a mapping relation with the identification information; wherein the tire information includes at least one of the tire usage data, the tire circulating records and the vehicle information.

In an embodiment of the present disclosure, the method further includes: receiving the license plate number of the vehicle, and an instruction for querying tire information of all tires of the vehicle corresponding to the license plate number; and sending the tire information of all tires belonging to the vehicle corresponding to the license plate number.

In an embodiment of the present disclosure, the method further includes: receiving the name of the fleet, and an instruction for querying tire information of the tires of all vehicles belonging to the fleet; sending the tire information of all tires of the vehicles belonging to the fleet.

In the second aspect, the present disclosure also provides a device for managing tire data, including: a receiving module configured to receive identification information for identifying a tire and tire usage data of the tire; and a storage module configured to establish and store a mapping relation between the identification information and the tire usage data, wherein the tire usage data includes one of a tire pressure, a tire temperature, and an accumulated driving mileage of the tire.

In an embodiment of the present disclosure, the storage module is further configured to receive tire circulating records of the tire, establish and store a mapping relation between the identification information and the tire circulating records; wherein, the tire circulating records include warehousing information, requisition information, installation information, repair records, inspection and maintenance information, retreading records, and scrapping records of the tire.

In an embodiment of the present disclosure, the storage module is further configured to receive vehicle information of a vehicle to which the tire belongs, establish and store a mapping relation between the identification information and the vehicle information, wherein the vehicle information includes a model of the vehicle, a license plate number, personal information of the owner, fleet information of the fleet to which the vehicle belongs, and information regarding the installation position of the tire on the vehicle. The fleet information comprises a name of the fleet.

In an embodiment of the present disclosure, the device further includes a querying module configured to receive the identification information and an instruction for querying tire information of the tire corresponding to the identification information; and send the tire information having a mapping relation with the identification information, wherein the tire information includes at least one of the tire usage data, the tire circulating records and the vehicle information.

In an embodiment of the present disclosure, the querying module is further configured to receive the license plate number of the vehicle, and an instruction for querying tire information of all tires of the vehicle corresponding to the license plate number; and send the tire information of all tires belonging to the vehicle corresponding to the license plate number.

In an embodiment of the present disclosure, the querying module is further configured to receive the name of the fleet, and an instruction for querying tire information of the tires of all vehicles belonging to the fleet; and send the tire information of all tires of the vehicles belonging to the fleet.

In the third aspect, the embodiments of the present disclosure also provide an electronic device, including: at least one processor; and at least one memory in communication connection with the processor; wherein the memory stores program instructions executable by the processor, the processor calls the program instructions to execute the methods above.

In the fourth aspect, the embodiments of the present disclosure also provide a non-transitory computer readable storage medium, wherein the non-transitory computer readable storage medium stores computer programs that enable a computer to execute the methods above.

The present disclosure also provides a method and device for managing tire data. The method includes: receiving a tire identification reported by a data sending module, a data interaction module or a data monitoring module, and tire usage data of a tire corresponding to the tire identification, correspondingly storing the tire usage data and the tire identification so that the corresponding identification information and the tire usage data can be quickly and efficiently found when a user calls these usage data. The unified management of the related data of the tire provides a data support for the big-data analysis of the tire based on these data, and also enables the unified management of a plurality of tires and multiple vehicles.

BRIEF DESCRIPTION OF THE DRAWINGS

In order to more clearly illustrate the embodiments of the present disclosure or the technical solutions in the prior art, the drawings to be used in describing the embodiments or the prior art will be briefly described below. Obviously, the drawings in the following description are some embodiments of the present disclosure, for those of ordinary skill in the art, other drawings may also be obtained based on these drawings without any creative work.

DETAILED DESCRIPTION

In order to make the objectives, technical solutions and advantages of the embodiments of the present disclosure clearer, the technical solutions of the embodiments of the present disclosure will be described clearly and completely with reference to the accompanying drawings hereinafter. Obviously, the described embodiments are merely some but not all of the embodiments of the present disclosure. On the basis of the embodiments of the present disclosure, all other embodiments obtained by the person of ordinary skill in the art without creative work shall fall within the protection scope of the present disclosure.

Figure 1:
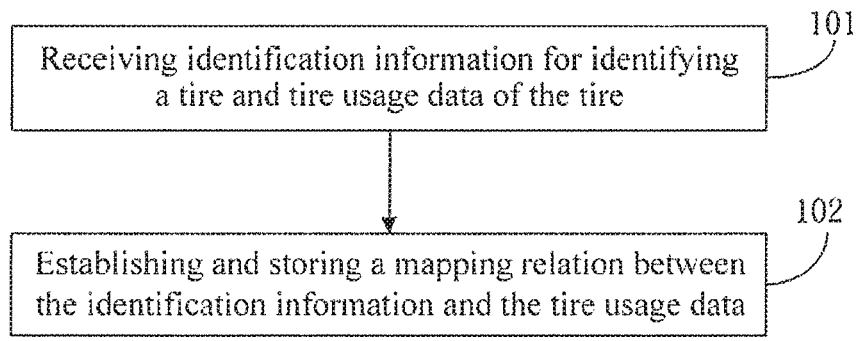
FIG. 1 is a schematic flow chart of a method for managing tire data provided by an embodiment of the present disclosure.

FIG. 1 is a flow chart of a method for managing tire data provided by an embodiment of the present disclosure. Referring to FIG. 1, the method includes: 101, receiving identification information for identifying a tire and tire usage data of the tire; and 102, establishing and storing a mapping relation between the identification information and the tire usage data; wherein the tire usage data includes a tire pressure, a tire temperature, and an accumulated driving mileage of the tire.

It should be noted that the method provided by the present embodiment is executed by a cloud server (data management device). The data received by the cloud server, for example, the tire usage data, may be directly provided by a data monitoring module installed in the tire, or the tire usage data may be sent by a data monitoring module to a data sending module (central control machine) in the vehicle through Bluetooth or a radio frequency circuit, and then reported to the cloud server by the data sending module. Alternatively, the tire usage data may be sent to a data interaction module (for example, a mobile phone or a handheld terminal) by the data monitoring module through Bluetooth or the radio frequency circuit, and then reported to the cloud server by the data interaction module, which is not specifically limited by the present embodiment.

It is to be appreciated that, after receiving the tire usage data and the corresponding identification information, the server establishes and stores a mapping relation between the identification information and the tire usage data, so that the user can directly search for the tire usage data through the identification information, or, for example, the user can find the identification information of all of the tires of which the tire pressures are a certain tire pressure values within a certain area at a certain time through the tire usage data.

In the method for managing tire data further provided by the present embodiment, after the tire identification reported by the data sending module, the data interaction module or the data monitoring module, as well as the tire usage data of the tire corresponding to the tire identification are received, the tire usage data and the tire identification are correspondingly stored so that the user can quickly and efficiently find the corresponding identification information and tire usage data when calling these usage data. The unified management of the related data of the tire provides a data support for the big-data analysis of the tire based on these data, and also enables the unified management of multiple tires and multiple vehicles.

Furthermore, on the basis of the embodiments above, the method further includes: receiving tire circulating records of the tire, establishing and storing a mapping relation between the identification information and the tire circulating records; wherein the tire circulating records includes the warehousing information, the requisition information, the installation information, the repair records, the inspection and maintenance information, the retreading records, and the scrapping records of the tire.

It should be noted that, the tire circulating records is generally uploaded by the data interaction module. After the data interaction module obtains the identification information of a tire, the staff enters the tire circulating records of the tire through the data interaction module, and then the data interaction module uploads the tire circulating records to the cloud server for storage.

It is to be appreciated that, after receiving the tire circulating records and the corresponding identification information, the server establishes and stores a mapping relation between the identification information and the tire circulating records, so that the user can directly search the tire circulating records through the identification information, or, for example, the user can find the identification information of all of the tires of which the tire pressures are certain tire pressure values within a certain area at a certain time through the tire circulating records.

The warehousing information of the tire circulating records includes a name and a location of warehouse in which tires are warehoused, the time when the tires are warehoused and etc. The requisition information includes the personal information of the person who requires the tire. The installation information includes the installation time of the tire and etc. The repair records include the repaired position, the repair method, the repair time and etc. The inspection and maintenance information includes the inspection and maintenance method, the inspection and maintenance time, and etc. The retreading records include the retreading time, the retreading place, and etc. The scrapping records include the scrapping time, the scrapping place and etc. The information regarding the installation position of the tire on the vehicle includes the position where the tire is installed on the current vehicle, for example, the tire is a front-left wheel, a front-right wheel, a rear-left wheel, or a rear-right wheel in the vehicle.

In the method for managing tire data further provided by the present embodiment, after the tire identification reported by the data sending module, the data interaction module or the data monitoring module, as well as the tire circulating records of the tire corresponding to the tire identification are received, the tire circulating records and the tire identification are correspondingly stored so that the user can quickly and efficiently find the corresponding identification information and tire circulating records when calling these tire circulating records. The unified management of the related data of the tire provides a data support for the big-data analysis of the tire based on these data, and also enables the unified management of multiple tires and multiple vehicles.

Furthermore, on the basis of the embodiments above, the method further includes: receiving vehicle information of a vehicle to which the tire belongs, establishing and storing a mapping relation between the identification information and the vehicle information; wherein the vehicle information includes the model of the vehicle, the license plate number, personal information of the owner, fleet information of the fleet to which the vehicle belongs, and the information regarding the installation position of the tire on the vehicle; the fleet information includes the name of the fleet.

In the method for managing tire data further provided by the embodiments, after the tire identification reported by the data sending module, the data interaction module or the data monitoring module, as well as the vehicle information of the tire corresponding to the tire identification are received, the vehicle information and the tire identification are correspondingly stored so that it is convenient for the user to check the tire conditions of each vehicle. At the same time, for the fleet manager, he/she can manage the vehicles in the fleet as a whole by checking the tire conditions of each vehicle in the fleet in time.

Figure 2:
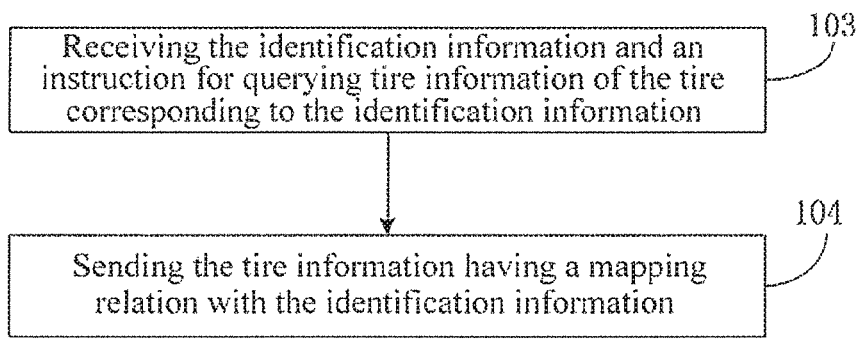
FIG. 2 is a schematic flow chart of a method for managing tire data provided by another embodiment of the present disclosure.

Furthermore, as shown in FIG. 2, on the basis of the embodiments above, the method for managing tire data provided by the present embodiment further includes: 103, receiving the identification information and an instruction for querying tire information of the tire corresponding to the identification information; and 104, sending the tire information having a mapping relation with the identification information; wherein the tire information includes at least one of the tire usage data, the tire circulating records and the vehicle information.

It should be noted that, when at least one of the tire usage data, the tire circulating records and the vehicle information that are stored need to be read by a staff, the received identification information may be sent to the cloud server (it is to be appreciated that, there is also a corresponding instruction to search for the tire information related to the identification information). After receiving the information, the server sends the tire usage data, the tire circulating records or the vehicle information that have a mapping relation with the identification information to the corresponding terminal device, for the staff to check.

The present embodiment provides a method for calling the stored tire information. Using this method, the tire information of the tire corresponding to the identification information can be obtained quickly and conveniently according to the identification information.

Furthermore, on the basis of the embodiments above, the method further includes: receiving a license plate number of a vehicle, and an instruction for querying tire information of all tires of the vehicle corresponding to the license number; and sending the tire information of all tires belonging to the vehicle corresponding to the license plate number.

The present embodiment provides a method for querying tire information of all tires installed on a vehicle corresponding to a license number through the license plate number. Using this method, tire data of a vehicle can be quickly and easily queried according to any information uniquely identifying the vehicle.

Furthermore, on the basis of the embodiments above, the method further includes: receiving a name of a fleet, and an instruction for querying tire information of tires of all vehicles belonging to the fleet; sending the tire information of all tires of the vehicles belonging to the fleet.

The present embodiment provides a method for querying tire information of all tires installed on vehicles through the name of the fleet. Using this method, tire data of all vehicles of the fleet can be quickly and easily queried according to the name of the fleet, so as to manage the vehicles of the fleet.

Figure 3:
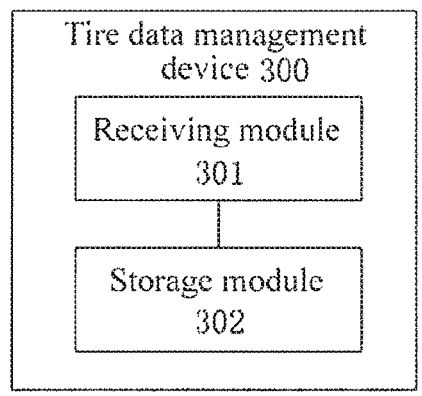
FIG. 3 is a block diagram of the structure of a device for managing tire data provided by yet another embodiment of the present disclosure.

In a second aspect, FIG. 3 illustrates a data management device 300 for tire provided by the present embodiment, including a receiving module 301 and a storage module 302, wherein, the receiving module 301 is configured to receive identification information for identifying a tire and tire usage data of the tire; and the storage module 302 is configured to establish and store a mapping relation between the identification information and the tire usage data; wherein the tire usage data includes one of the tire pressure, tire temperature, and an accumulated driving mileage of the tire.

The data management device provided by the present embodiment is applicable to the foregoing data management methods, which will not be repeated herein.

The embodiments of the present disclosure further provide a device for managing tire data. After receiving the tire identification reported by the data sending module, the data interaction module or the data monitoring module, as well as the tire usage data of the tire corresponding to the tire identification, the device correspondingly stores the tire usage data and the tire identification so that the user can quickly and efficiently find the corresponding identification information and tire usage data when calling these usage data. The unified management of the related data of the tire provides a data support for the big-data analysis of the tire based on these data, and also enables the unified management of multiple tires and multiple vehicles.

Figure 4:
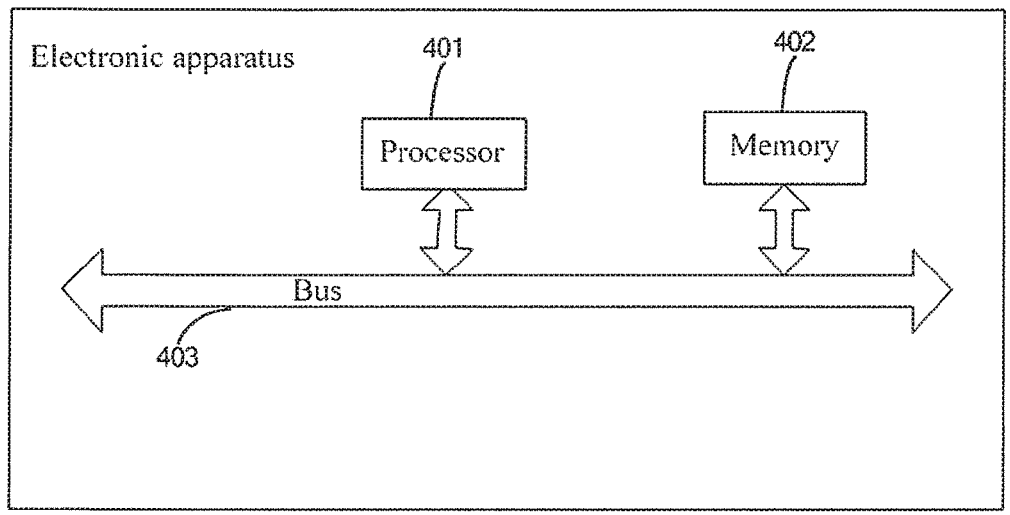
FIG. 4 is a schematic structural diagram of an electronic apparatus provided by still another embodiment of the present disclosure.

In a third aspect, FIG. 4 is a structural diagram of an electronic apparatus provided by an embodiment of the present disclosure.

Referring to FIG. 4, the electronic apparatus includes a processor 401, a memory 402 and a bus 403; wherein the processor 401 and the memory 402 communicate with each other through the bus 403; the processor 401 is configured to call program instructions in the memory 402 to execute the methods provided by the foregoing method embodiments, for example, including: receiving identification information for identifying a tire and tire usage data of the tire; and establishing and storing a mapping relation between the identification information and the tire usage data; wherein the tire usage data includes the tire pressure, the tire temperature, and the accumulated driving mileage of the tire.

The present embodiment provides a non-transitory computer-readable storage medium that stores computer instructions, and the computer instructions enable the computer to execute the methods provided by the foregoing method embodiments, for example, including: receiving identification information for identifying a tire and tire usage data of the tire; establishing and storing a mapping relation between the identification information and the tire usage data; wherein the tire usage data includes the tire pressure, the tire temperature, and the accumulated driving mileage of the tire.

Figure 5:
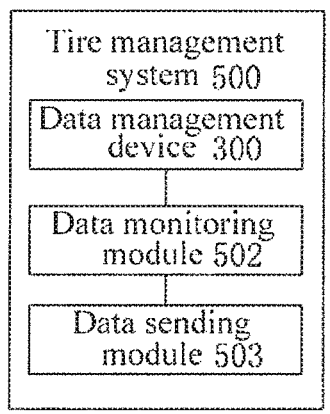
FIG. 5 is a schematic structural diagram of a tire management system provided by still another embodiment of the present disclosure.

The device 300 for managing tire data provided by the present embodiment is used in a tire management system 500 as shown in FIG. 5. FIG. 5 is a structural diagram of the tire management system 500 provided by the present embodiment. Referring to FIG. 5, the tire management system 500 includes a data management device 300 (a data management module or a cloud server), a plurality of data monitoring modules 502 installed in the tire, and data sending modules 503 corresponding to the data monitoring modules 502.

Each data monitoring module 502 is configured to acquire the tire usage data of the tire installed with the data monitoring module and identification information for identifying the data monitoring module, and sends the acquired tire usage data and the identification information to the data sending module 503 corresponding to the data monitoring module 502. The data sending module 503 sends the received tire usage data and the identification information to the data management device 300. The data management device 300 establishes and stores a mapping relation between the tire usage data and the identification information. The tire usage data includes at least the tire pressure and the tire temperature of the tire.

It should be noted that, the data management device 300 is an electronic apparatus for storing the data related to the tire. For example, the data management device 300 may be a cloud server or a normal server, as long as it is capable of storing the tire data and outputting the tire data o after receiving an instruction for reading the tire data. The specific form of the data management device is not limited by the present embodiment.

The data monitoring module 502 is usually an electronic apparatus installed in the tire, for example, a tire pressure sensor or a tire temperature sensor installed on the crown of an inner wall of the tire. Generally, a tire pressure sensor, a tire temperature sensor, or other electronic chip has a code that uniquely identifies its identity. In order to overcome the shortcoming of the conventional tire identification, in this embodiment, the code uniquely identifying a certain sensor or a chip installed in a tire is used as the identification information identifying the tire, therefore the data having a mapping relation with the identification information is the data of the tire. The data monitoring module 502 installed in each tire sends its own identification information and the monitored tire usage data to the data sending module 503, and the data sending module 503 sends the identification information and the monitored tire usage data to the data management device 300, so that the data management device 300 can store the identification information and the tire usage data correspondingly.

Generally, each vehicle is provided with a data sending module 503. The data monitoring modules 502 installed on all tires of the vehicle transmit the identification information and the monitored tire usage data to the data sending module 503 on the vehicle. These data are uploaded to the data management device 300 by the data sending module 503 so as to achieve the unified management of the usage data of the tires module.

The tire management system 500 provided by the present embodiment acquires various monitoring data during the running of the tires through the data monitoring modules 502 installed in each tire, and then reports the monitoring data and the identification information capable of functioning as identifying the tires to the data sending module 503 in the vehicle. The data sending module 503 sends the monitoring data and the corresponding identification information to the data management device 300, the data management device 300 classifies and stores the monitoring data corresponding to each tire. All the monitoring data related to a certain tire can be conveniently acquired through the data management device, which is convenient for performing the related analysis on the tire in combination with the data of various aspects of the tire. Alternatively, the monitoring data of the tires of a plurality of vehicles can be acquired through the data management device, so that the plurality of vehicles are performed on unified management.

Figure 6:
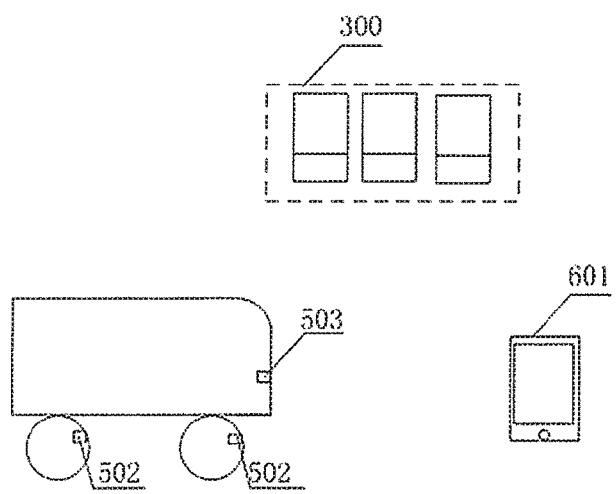
FIG. 6 is a schematic diagram showing the installation positions of each module of the tire management system provided by another embodiment of the present disclosure.

Further, FIG. 6 is a schematic diagram of the installation positions of each module of the tire management system provided by the present embodiment. As shown in FIG. 6, on the basis of the embodiments above, a data interaction module 601 is further included. The data interaction module 601 is configured to acquire identification information of the data monitoring modules, and receive the tire circulating records of the tire installed with the data monitoring module 502, and transmit the tire circulating records to the data management device 300. The data management device 300 is configured to establish and store a mapping relation between the tire circulating records and the identification information. The tire circulating records includes at least the warehousing information, the requisition information, the installation information, the repair records, the retreading records and the scrapping records of the tire.

It should be noted that, the data interaction module 601 is an electronic apparatus capable of interacting information with the data monitoring modules 502, acquiring the identification information of the data monitoring modules 502, and acquiring the tire circulating records of the tire where the data monitoring module 502 is located. Meanwhile, the data interaction module 601 can interact data with the data management device 300, for example, the data interaction module 601 may be a handheld terminal having the above functions, or may be an electronic apparatus capable of exchanging data with the data monitoring modules 502 and a mobile phone, or may be a combination of mobile phones. The specific form of the data interaction module 601 is not limited by the present embodiment.

The tire circulating records may be manually entered by a staff member through the data interaction module 601 (for example, manually entered through a keyboard of a handheld terminal or a mobile phone keyboard), or may be obtained by scanning a two-dimensional code or a bar code with tire circulating records information. The data management device 300 stores the tire circulating records with the identification information of the tire, so as to facilitate the query of the tire circulating records of the tire according to the identification information of the tire.

As shown in FIG. 6, the data monitoring modules 502 are installed in the tires of a vehicle. The data monitoring modules 502 transmit the acquired tire usage data to the data sending modules 503 in the vehicle, the data sending modules 503 sends the tire usage data and the corresponding identification information to the data management device 300. The data interaction module 601 acquires the identification information of the tire and the tire circulating records of the tire, and sends the tire circulating records and the corresponding identification information to the data management device 300 to implement the unified management of tire data.

In the tire management system provided by the present embodiment, the warehousing information, requisition information, installation information, repair records, retreading records and scrapping records of tires are acquired through the data interaction module, and these data are sent to the data management device, thereby ensuring the integrality of the recorded tire data.

Further, on the basis of the various embodiments above, a first display module connected to the data interaction module is further included.

The data interaction module acquires the identification information of the data monitoring modules in the tires, and sends the identification information to the data management device. The data management device sends the tire usage data and the tire circulating records related to the identification information to the data interaction module according to the mapping relation of the identification information. The data interaction module sends the tire usage data and the tire circulating records related to the identification information to the first display module, and the first display module is configured to display the tire usage data and the tire circulating records.

It should be noted that, the first display module is configured to display data that can be acquired by the data interaction module, for example, to display the tire usage data, the tire circulating records, and the corresponding identification information. The first display module may be a display screen of the above-mentioned handheld terminal or mobile phone.

In the tire management system provided by the present embodiment, the data interaction module can acquire and display the tire circulating records of the tire, so that the staff can confirm that the information is correct, and then transmits the tire circulating records to the data management device. On the other hand, the data interaction module can also read the tire usage data and the tire circulating records of the tire from the data management device, and display them through the first display module, which is convenient for the staff to know the tire data in time.

Further, on the basis of the various embodiments above, a second display module connected to the data sending module is further included.

The data sending module receives the tire usage data and the identification information sent by corresponding data monitoring module, and sends the tire usage data and the identification information to the second display module, and the second display module is configured to display the tire usage data and the identification information.

As shown in FIG. 6, the data sending module is usually an electronic device provided on a center console or a windshield of the vehicle. The electronic device can receive the tire usage data sent by the data monitoring modules in the tires of the vehicle and display the tire usage data of each tire through the second display module, which is convenient for the driver to know the current state of each tire of the vehicle in time. It can be understood that when the tire usage data of a certain tire is abnormal, a prompt message can also be sent through the second display module.

In the tire management system provided by the present embodiment, the data sending module not only receives the tire usage data sent by the data monitoring modules in the tires of the vehicle, but also displays the received tire usage data, which is convenient for the driver to know the current state of each tire of the vehicle, and deal with abnormal situations in time.

Further, on the basis of the various embodiments above, the data sending module further includes an alarm unit. The alarm unit is configured to issue an alarm message when it is judged that the tire pressure in the tire usage data exceeds a preset tire pressure or the tire temperature in the tire usage data exceeds a preset tire temperature. The data sending module is further configured to send the alarm message to the data management module.

It should be noted that, both the preset tire pressure and the preset tire temperature are preset values. The alarm message can be a message displayed by the second display module, or can be displayed by other methods (for example, an alarm light is provided, and the alarm message is displayed through the color of the light), which is not specifically limited by the present embodiment.

In the tire management system of the tire provided by the present embodiment, the data sending module can provide the driver with the tire temperature and the tire pressure data in the tires in real time, and can display the alarm message through the second display module when the tire pressure in the tire exceeds the preset tire pressure or the tire temperature in the tire exceeds the preset tire temperature, so as to prompt the driver to deal with the corresponding alarm message in time.

Furthermore, on the basis of the embodiments above, a tire tread depth detection module is also included. The tire tread depth detection module is configured to detect a tread depth on the surface of a tire, and sends the detected tread depth to the data interaction module. The data interaction module acquires the identification information of the data monitoring module in the tire, and sends the tread depth and the identification information to the data management device. The data management device establishes and stores a mapping relation between the tread depth and the identification information.

It should be noted that, the tire tread depth detection module is an electronic apparatus that measures the tread depth on the surface of the tire. For example, the electronic apparatus can read the tread depth on the surface of the tire through the operation of the staff, at the same time, the electronic apparatus can also obtain the identification information of the tire, and send the tread depth and the corresponding identification information to the data interaction module, and then the data interaction module stores the tread depth within the corresponding identification information.

It is to be appreciated that, after the data interaction module receives the tread depth on the surface of the tire, the staff can also evaluate the current condition of the tire according to the tread depth, and send the evaluation result to the data management device together.

The present embodiment provides a tire tread depth detection module capable of exchanging information with the data interaction module and the data monitoring modules. The tire tread depth detection module can transmit the tread depth of the tire and the corresponding identification information to the data interaction module, and then the tire depth of the tire is stored within the corresponding identification information through the data interaction module, which improves the tire information in the data management device.

Figure 7:
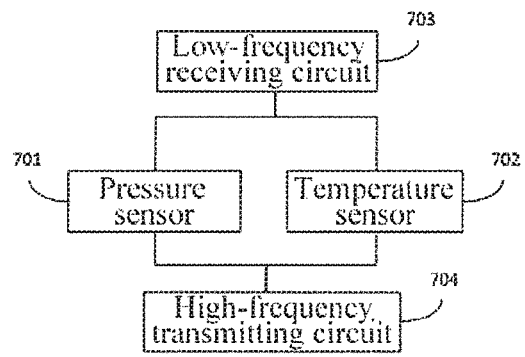
FIG. 7 is a schematic structural diagram of the data monitoring module provided by another embodiment of the present disclosure.

Further, on the basis of the various embodiments above, FIG. 7 illustrates a structural diagram of the data monitoring module. Referring to FIG. 7, the data monitoring module includes an electronic box, a pressure sensor 701, a temperature sensor 702, a low-frequency receiving circuit 703, and a high-frequency transmitting circuit 704.

A first code uniquely identifying the pressure sensor 701, or a second code uniquely identifying the temperature sensor 702 is used as the identification information identifying the data monitoring module.

The high-frequency transmitting circuit 704 is configured to transmit the identification information, the tire pressure collected by the pressure sensor 701, and the tire temperature collected by the temperature sensor 702.

The low-frequency receiving circuit 703 is configured to receive signals sent by the terminal that control the pressure sensor 701 to start collecting the tire pressure and control the temperature sensor 702 to start collecting the tire temperature.

The pressure sensor 701, the temperature sensor 702, the low-frequency receiving circuit 703 and the high-frequency transmitting circuit 704 are installed in the electronic box.

It should be noted that, the low-frequency receiving circuit 703 and the high-frequency transmitting circuit 704 are circuits for data interaction between the data monitoring module and other devices. It is to be appreciated that, the low-frequency receiving circuit 703 and the high-frequency transmitting circuit 704 may be replaced by other circuits or devices, for example, using Bluetooth to receive and send data. It is also to be appreciated that, when the data monitoring module uses Bluetooth to exchange data with the terminal or the data sending module, the terminal or the data sending module should also have a Bluetooth function that matches the Bluetooth of the data monitoring module.

It is to be appreciated that, the sensors included in the data monitoring module provided by the present embodiment include a pressure sensor 701 and a temperature sensor 702. When other data of the tire needs to be measured, other sensors may be added to the data monitoring module. The data acquired by the added sensor also implements data interaction with other devices through Bluetooth in the data monitoring module, or the low-frequency receiving circuit 703 and the high-frequency transmitting circuit 704.

The present embodiment provides a structure of the data monitoring module, and through this structure, information interaction between the data monitoring module and other modules or devices can be achieved.

Further, on the basis of the data monitoring module provided by the various embodiments above, the present embodiment provides two methods for installing the data monitoring module on a tire, which are respectively as follows.

The data monitoring module further includes a metal bracket located on an inner wall of the tire and bonded to the tire through vulcanization. The electronic box is fixed on the metal bracket.

In an embodiment of the present disclosure, the data monitoring module further includes a bonding layer and a rubber sleeve. The electronic box is fixed in the rubber sleeve which is attached to a crown of the inner wall of the tire through the bonding layer.

It is to be appreciated that, in addition to that the data monitoring module is combined with the tire through the metal bracket or the rubber sleeve, there may also be other connecting ways. How to specifically implement the combination of the data monitoring module with the tire is not limited by the present embodiment, as long as the data monitoring module can be fixed on the tire to collect the data in the tire.

Further, on the basis of the various embodiments above, the data sending module and the second display module are provided in the vehicle body of the vehicle. The data sending module receives the tire usage data and the identification information sent by the data monitoring module installed in each tire of the vehicle, and sends the received tire usage data and identification information to the data management device. The second display module displays the tire usage data and the identification information of each tire of the vehicle received by the data sending module.

It should be noted that, the electronic device (for example, the master control receiver) integrated with the data sending module and the second display module can be installed on the center console of the vehicle or attached to the windshield of the vehicle, as long as it is convenient for the driver to check where this information is located.

Further, on the basis of the various embodiments above, the data sending module further includes a positioning unit. The positioning unit is configured to acquire the position information of the vehicle where the data sending module is located. The data sending module sends the position information, and the identification information of the data monitoring modules installed in each tire of the vehicle to the data management device. The data management device establishes and stores a mapping relation between the position information and the identification information corresponding to each tire of the vehicle.

It should be noted that, the positioning unit may be a GPS positioning system that can send the vehicle position obtained by GPS positioning to the data management device in real time, so as to obtain the mileage of the tire by the real time position.

An installation housing for installing the data sending module and the second display module is also included. The installation housing is provided with a bracket or a suction cup through which the installation housing is installed on the inner wall of the vehicle body.

Figure 8:
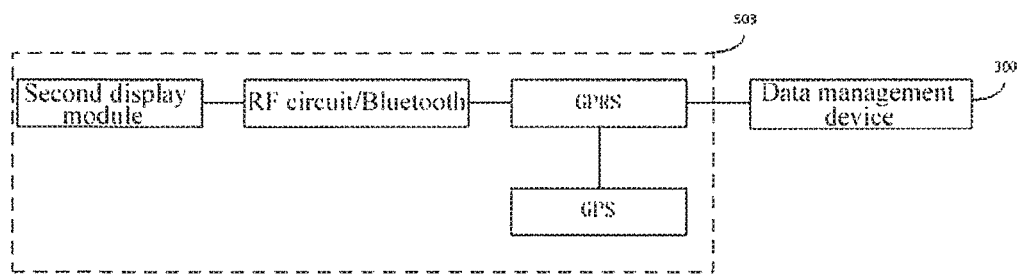
FIG. 8 is a schematic structural diagram of the data sending module provided by another embodiment of the present disclosure.

For example, as shown in FIG. 8, the data sending module 503 includes a radio-frequency circuit or Bluetooth, a second display module, GPRS through which data exchange between the data sending module 503 and the data management device 300 is achieved, and GPS. The radio-frequency circuit or Bluetooth is configured to receive the tire usage data sent by the tire of the vehicle, the second display module is configured to display the tire usage data, and at the same time, GPRS sends the tire usage data to the data management device. On the other hand, GPS achieves the positioning of the vehicle, sends the positioning information to GPRS, and GPRS sends the positioning information to the data management device, so as to record the driving mileage of the tire.

The data sending module and the second display module are master control receivers including a casing and a circuit board, a power module design, a micro controller, an RF radio frequency receiving module, an LCD display module, a memory, buttons, state indicator, SMA interface connected to the antenna, Bluetooth module, GPS and GPRS 2-in-1 function module provided inside the casing.

The master control receiver further includes a receiver housing through which the receiver can be installed on the center console of the vehicle via a bottom bracket, or fixed on the front windshield of the vehicle via the suction cup, or installed on the rear view mirror of the vehicle via the bracket, so as to achieve multiple ways of installation.

For example, the master control receiver is placed on a truck to receive real-time state data from the data monitoring modules (for example, TPMS sensors) of the tires, and display the tire temperature and the tire pressure of each tire on each axis on the second display module (for example, block code LCD screen) in real-time. In addition, when an abnormal situation occurs on the tire, a sound and light alarm signal is sent out through the second display module to promptly inform the driver of the running state of the tire so as to ensure the driving safety.

On the other hand, in order to achieve the remote monitoring of each vehicle in a fleet (a plurality of vehicles), including the monitoring of tire pressure, tire temperature, and real-time location, the receiver is equipped with GPS module and GPRS module so that the received tire pressure data and the tire temperature data are uploaded to the data management device (cloud server) in real time through the bilateral GPRS network, and the real-time information is displayed through the data interaction module or other electronic device capable of performing data interaction with the data management device, so as to monitor each vehicle.

Figure 9:
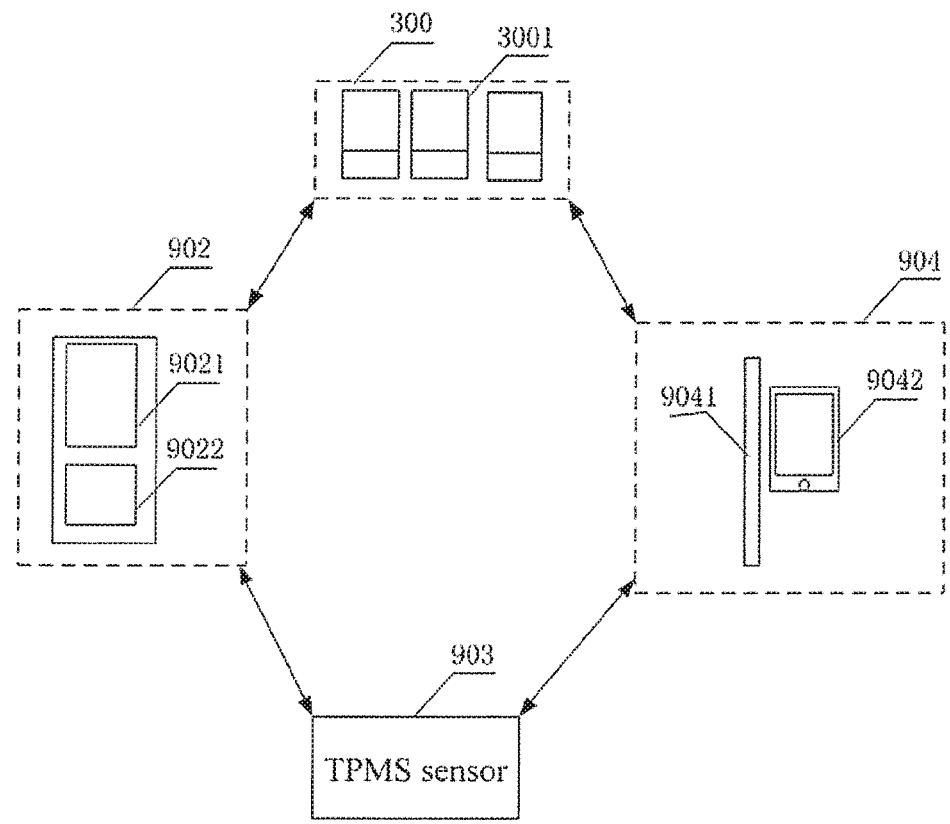
FIG. 9 is a schematic diagram of two structures of two terminals provided by another embodiment of the present disclosure.

Further, on the basis of the various embodiments above, the data interaction module is configured to implement information interaction with the data monitoring module and the data management device, and may be a computer or other electronic device capable of implementing the information interaction function. The present embodiment provides two structures of the data interaction module in combination with practical applications. As shown in FIG. 9, a TPMS sensor 903 is a data monitoring module installed in the tire. The data management device 300 specifically includes cloud servers 3001. The data interaction module 601 may be a first terminal 902 (for example, a handheld terminal) or a combination 904 of a scanning stick 9041 and a second terminal 9042 (for example, a mobile phone).

For example, when the data interaction module is the first terminal 902, it is the first terminal including a camera, a low-frequency receiving circuit, a high-frequency transmitting circuit, a wireless communication unit, and a processor. The high-frequency transmitting circuit sends a message indicating the acquisition of the identification information of the data monitoring module to the data monitoring modules in the tire. The low-frequency receiving circuit is configured to receive the identification information sent by the data monitoring modules in the tire. The camera is configured to acquire information of a two-dimensional code or a bar code, and the processor is configured to acquire the tire circulating records of the tire through the two-dimensional code or the bar code. The wireless communication unit is configured to send the identification information and the tire circulating records to the data management device.

The data interaction module further includes an input keyboard (for example, the input keyboard 9022 of the first terminal 902 in FIG. 9). The input keyboard is configured to acquire the tire circulating records of a tire by entering characters.

The first display module (for example, the display screen 9021 of the first terminal 902 in FIG. 9) is further configured to display the acquired tire circulating records.

For example, when the data interaction module is a combination 904 of a scanning stick 9041 and a second terminal 9042, the scanning stick 9041 is configured to acquire the identification information of the data monitoring modules in the tire, and send the identification information to the second terminal 9042. The second terminal 9042 is configured to acquire the tire circulating records of the tire, and send the tire circulating records and the identification information to the data management device 300.

The scanning stick 9041 includes a low-frequency receiving circuit, a high-frequency transmitting circuit, and a Bluetooth unit. The high-frequency transmitting circuit sends a message indicating the acquisition of the identification information of the data monitoring modules to the data monitoring module in the tire. The low-frequency receiving circuit is configured to receive the identification information sent by the data monitoring module in the tire.

The Bluetooth unit sends the identification information received by the low-frequency receiving circuit to the second terminal.

Furthermore, on the basis of the various embodiments above, the tire tread depth detection module includes a movable probe, a Bluetooth unit, a display unit, and a control unit. The control unit is configured to control the movement of the movable probe to detect the tread depth of the tire surface. The display unit is configured to display the measured tread depth according to the movable probe. The Bluetooth unit is configured to send the measured tread depth.

Figure 10:
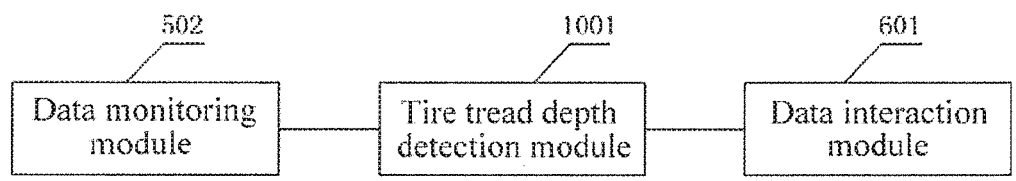
FIG. 10 is a schematic diagram of the connecting relation of a tire tread depth detection module with the data monitoring module and the terminal provided by another embodiment of the present disclosure.

As shown in FIG. 10, the tire tread depth detection module 1001 can interact information with the data monitoring modules 502 and the data interaction module 601. That is, the tire tread depth detection module 1001 can interact information with the data monitoring module 502 and the data interaction module 601 through an RF circuit or Bluetooth.

Figure 11:
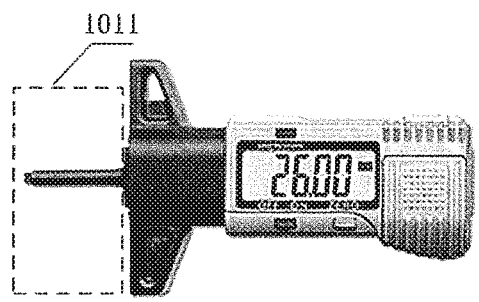
FIG. 11 is a schematic structural diagram of the tire tread depth detection module provided by another embodiment of the present disclosure.

FIG. 11 illustrates a structural diagram of the tire tread depth detection module 1001. When the tire tread depth detection module 1001 is used for measuring the tread depth of a tire, the staff places a movable probe (as the portion 1011 shown in FIG. 11) in the groove of the tire tread, and controls the movable probe until the probe reaches the bottom of the groove of the tread, then the tire tread depth detection module 1001 displays the length of the extended probe in real time according to the length of the extended probe until the number displayed is stable. After the staff confirms that the number is the tread depth of the tire, the tread depth is displayed through the display unit (as shown in the display screen in FIG. 11) and sent to the data interaction module through the Bluetooth unit.

As another embodiment, the data monitoring module is adhered to an inner wall crown of an outer tire of the vehicle and includes a temperature sensor, a pressure sensor, an acceleration sensor, a memory, a receiver, a transmitter, a calculator, a software pack, a battery pack, and a PCB board etc. The data monitoring module is configured to monitor the pressure, the temperature and the acceleration of the tire in real time, and uses sensors such as an acceleration sensor in conjunction with (IPS positioning to accurately calculate the driving mileage of the tire. At the same time, the sensor chip used by the device has a unique identification code ID (identification information), when the sensor is permanently combined with the entire life cycle of the tire, this ID number can be used as a separate permanent tire identification number. The ID number can completely replace the use of the current conventional bar code and RFD as the identity code of the tire, thereby avoiding the situation during the use and circulating that the bar code is easily to fall off and to be wore. Once this information fails to be visual and scanned by instruments, it means the loss of the tire information, which makes it impossible to identify the information of the tire model, the driving mileage, the tread depth, the transposition and maintenance etc., and thus losing the significance of monitoring the entire life cycle of the tire.

The data monitoring module includes a sensor electronic box, a rubber sleeve, and a bonding layer. The electronic box is configured to install the electronic components of a tire pressure monitoring device; the rubber sleeve is provided with an inner space in which the electronic box is installed and a bottom surface having an area greater than the cross-section of the inner space. The bottom surface is provided with a bonding layer having an area greater than that of the bottom surface. However, the data monitoring module can not only be attached to the tire through the rubber sleeve and the bonding layer, but can also be installed to the vulcanized metal bracket in the tire through other parts such as a mechanical structural member. In addition, the data monitoring module can also be installed integrally to a specially designed tire in a combination way.

The data monitoring module can monitor the pressure, the temperature and the acceleration of the tire in real time, and cooperate with GPS positioning in the vehicle to achieve the accurate calculation of the driving mileage of the tire. The data monitoring module includes a sensor electronic box, a rubber sleeve, and a bonding layer. The electronic box is configured to install the electronic components of the tire pressure monitoring device, including a battery powering unit, a low-frequency LF receiving circuit unit, a high-frequency RF transmitting circuit, and a sensor unit integrating MCU, temperature measurement, pressure measurement and acceleration measurement.

In short, the data monitoring module can not only be attached to the tire, but can also be installed in other ways, such as being installed to the vulcanized metal bracket of the tire. In addition, the data monitoring module can also be combined with a specially designed tire. The sensor chip of the data monitoring module has a unique identification ID that can be used as an identification of the tire. The data monitoring module can also cooperate with GPS in the system through the acceleration signal to accurately calculate the driving mileage of the tire.

In addition, the receiver in an existing conventional TPMS system, whether the receiver of a front-installed or a rear-mounted system, only receives the sensor data in the tire and displays them through a display system, and the system is only helpful to the driver driving the vehicle. Therefore, such system has failed to meet the needs of fleet management, and the staff cannot know the running states of the tires of the vehicle during driving, and whether the driver has timely performed inflating or deflating operations for the low-pressured tires and high-pressured tires, respectively so that the tires are in the best running state, thus the fleet management cannot be achieved. Therefore, the conventional TPMS receiving system has failed to meet the management needs of the fleet in the era of big data.

On this basis, the present embodiment provides a data sending module and a first display module. The data sending module and the first display module (combined to be a master control receiver) are placed on the center console of a truck or a bus to receive the data sent by the above-mentioned tire pressure monitoring devices (the data monitoring modules), and send the tire pressure, the tire temperature, the heavy load and no load, the road conditions, and the environmental information monitoring data that are received to the cloud platform (the data management system) through GPRS and the data are stored in the corresponding identification information by the cloud platform. At the same time, the positioning information of the vehicle, and the driving mileage accumulated by the acceleration sensor and GPS are sent to the cloud platform, and sent, by the could platform, to the identification information of the management background. The master control receiver includes a casing and a circuit board, a power module design, a micro controller, an RF radio frequency receiving module, an LCD display module, a memory, SMA interface connected to the antenna, Bluetooth module, GPS and GPRS 2-in-1 function module arranged inside the casing.

In the first aspect, the casing structure of the master control receiver provided in the present embodiment satisfies a variety of installation methods, and basically meets the installation of the existing trucks and buses. The bottom of the casing has an installing fixing bracket opening for connecting the bracket so as to be installed behind the rear view mirror. The rear of the casing is provided with a threaded hole to facilitate the installation of the suction cup. The hole in the casing of the master control receiver can be connected to the bracket on the center console, and the receiver can be fixed on the center console by screwing, which implements various ways of installation and ensures that the product of the present disclosure can meet the installation requirements of various vehicle models. In the second aspect, the RF radio frequency chip of the master control receiver provided by the present embodiment has the transmitting-receiving integrated function, and can not only receive the tire pressure and tire temperature data sent by the tire pressure monitor, but also communicate with an external handheld tool (the data interaction module) to implement the configurations of the vehicle model and axle information in the master control receiver and the sensor ID stored on each wheel through an external configuration tool. In the third aspect, the built-in GPS module of the master control receiver provided by the present embodiment can achieve the real-time positioning of the vehicle, the trail drawing of the vehicle, and the data collection of the vehicle speed. In an embodiment, the collected vehicle speed information, the tire pressure information and the tire temperature information etc. together can provide data support for research and development on tire. In a fourth aspect, the built-in GPS module of the master control receiver provided by the present embodiment can cooperate with the acceleration sensor in the tire pressure monitoring sensor to calculate the driving mileage of each tire, thereby achieving the purpose of accurately calculating the driving mileage of each tire. It is not accurate to calculate the driving mileage only by the odometer, because many tires on a same axle are lifted without running in the actual running of a truck fleet. While in the system of the present disclosure, the sensors in the tires send acceleration information to notify UPS to start to accumulate mileage as long as the tires rotate, thereby calculating the mileage of each tire, in a fifth aspect, the master control receiver provided by the present embodiment supports a GPRS remote communication function, and can implement remote data interaction with the cloud server, and upload the real-time data sent by the tire pressure monitor received by the master control receiver to a background server the related fleet information is displayed through front-end software. At the same time, For The data changes in the background, such as resetting the high-pressure alarm value on the wheel axle in different seasons, and resetting the high-temperature alarm value on the wheel axle in different seasons and tire transposition and tire deletion can be performed in the background through the handheld. PDA or mobile phone APP in the present disclosure, as long as the configuration information changes, the background will notify the smart master receiver in the corresponding vehicle via GPRS communication of updating the saved parameters, so as to achieve the purpose of synchronizing with the background system and eventually achieve the remote control.

The present embodiment provides a data interaction module. The data interaction module is a handheld PDA configured to integrate three scanning functions and capable of scanning a bar code or be used as an RFID reader. At the same time, the data interaction module can activate the sensor to work and read the ID of a TPMS sensor attached to the tire, and bind the bar code information and the RFID information that belong to the unique ID number of the tire, and the ID of the TPMS sensor attached to the tire, and select, in combination with the device, a specific scenario of the tire in the life cycle, such as assembling of the tire in the original tire production line, warehousing, ex-warehousing and docking with the ERP system; the sales and circulating records; the repair and monitoring records of the tires by the fleet; the daily replacement and movement of the tires by the fleet; and the tire retreading, etc. The data interaction module includes a casing, as well as a circuit board, an LF transmitting module, an RF receiving module, a Bluetooth module, a micro controller, a battery pack, buttons, indicator lights, and a buzzer that are installed inside the casing. The wireless method includes: sending the combined information to a computer, the cloud and the management background through Bluetooth, WIFI, and GPRS to achieve the life cycle management of the tire.

The handheld PDA is compatible with the existing conventional disclosures. The device mainly implements the code scanning function, and can upload the scanned data to the cloud platform through the network, and dock with the management background to achieve the data networking so that the device is used freely in various application scenarios. The device can achieve the code scanning of various stages from warehouse management, the sales, the usage, the maintenance and the retreading until scrapping of the tire, and cooperate with the background management system to save and record data. At the same time, the handheld tool can be used to communicate with the above-mentioned master control receiver to install the receiver, bind a one-to-one relation between the license plate number and the receiver, set the license plate and the model information in the background. By clicking "installation" of the receiver, and selecting the corresponding license plate number to install the master control receiver, the corresponding vehicle model will be displayed on the master control receiver, including the setting of the vehicle model information about how many tires the truck or the bus to be monitored has, how many axles there are, and how many tires are on each axle. At the same time, the ID of the sensor installed on each tire is also set in the master control receiver to achieve the purpose of sensor pairing.

The handheld PDA integrates the functions of scanning bar codes, RFID and TPMS sensor ID, which better meets the tire pressure requirements of the fleet than the existing handheld PDA that can only scan bar codes and MD on the market. Meanwhile, the handheld PDA is different from those capable of only exciting the tire pressure sensor, and has more powerful functions and a wider application range. The handheld PDA integrates a low-frequency transmitting module and an RF radio frequency receiving module, and has a GPRS module as well. The handheld PDA can send the excited sensor data to the cloud server through GPRS, and send the scanned bar code information and MD chip information to the cloud server for storage. The handheld PDA can upload the scanned data to the server through GPRS, and participate in the storage and recording in various stages, such as acquiring the identity information of the tire through the warehousing of new tires, the selection and entering of tire numbers, one-dimensional codes, RFID scanning codes, TPMS scanning codes, etc.; selecting the warehouse number to perform the warehousing confirmation operation in a later stage; the information recording such as the uninstallation of the tire, the position of the uninstalled tire and the reason of the uninstallation; the information recording such as the installation of the tire, on which vehicle the tire is installed, and at which wheel position the tire is installed. The data of all stages will saved in the cloud platform. The handheld PDA can achieve the remote GPRS communication function with the above-mentioned smart master control receiver, and can timely notify the master control receiver of the information that has been changed through the handheld PDA, so as to achieve the timely synchronous data update of the master control receiver and the background. The handheld PDA can perform RF communication with the above-mentioned master control receiver device to bind the master control receiver with the license plate number as well as the actual vehicle model, to implement the installation and configuration of the receiver in the vehicle. The handheld PDA can communicate with a repeater to achieve the installation of the repeater on a logistical trailer, and achieve the tire pressure monitoring of longer vehicle models.

On the other hand, considering the current widespread use and holding of smart phones, the data interaction module provided by the present embodiment is a smart phone, and a portable Bluetooth TPMS scanning stick used with the smart phone. Compared with the above-mentioned handheld PDA, the Bluetooth TPMS scanning stick can be a good solution in terms of convenient experience and cost saving. The Bluetooth TPMS scanning stick can activate and scan the tire pressure monitoring device of the present disclosure, read the ID number of the tire pressure monitoring device chip, and simultaneously scan the conventional bar codes and two-dimensional codes through a mobile phone camera. The Bluetooth scanning stick is connected to the Bluetooth of a smart phone through a built-in Bluetooth communication module to communicate. The smart phone downloads a dedicated. APP. The Bluetooth scanning stick firstly activates the tire pressure monitoring device, reads the ID of the chip in the device, and sends the ID number to the cloud through the smart phone. The unique ID number of the tire is established after being accepted by the management background. Afterwards, the pressure and temperature in the tire can be read Through the hardware circuit board arranged in the casing including a MCU main control unit, an LF low-frequency transmission module, an RF transceiver integrated module, a low power consumption BLE Bluetooth module, a power charging control circuit unit, a key switch, a state indicator, a buzzer, and a vibration prompt unit. The Bluetooth TPMS scanning stick can be conveniently close to an inner tire in the two tires arranged side-by-side of the vehicle, thereby facilitating exciting the tire pressure monitoring device in the inner tire. The scanning stick has a built-in rechargeable lithium polymer battery configured to charge the scanning stick through a USB port. The portable Bluetooth TPMS scanning stick is characterized by that it can communicate with the tire pressure monitor attached to the tire through low frequency LF, so that the tire pressure monitor is activated to send out RF data, especially the RF data of the sensor ID. The RF receiving module in the Bluetooth TPMS scanning stick can receive the RF data sent by the tire pressure monitor, especially the ID of the sensor, i.e. the unique identification code of the entire life cycle of the tire, and send this unique identification code of the tire to the mobile phone APP through the Bluetooth module. The scanned data is uploaded to the cloud platform through GPRS communication in the mobile phone so as to dock the systems with the management background to achieve the data networking so that the Bluetooth TPMS scanning stick is used freely in various application scenarios. The Bluetooth scanning stick can also achieve the code scanning of various stages from warehouse management, the sales, the usage, the maintenance and the retreading until scrapping of the tire, and cooperate with the background management system to save and record data.

Compared with the above-mentioned handheld PDA, the Bluetooth TPMS scanning stick may be a good solution in terms of cost saving. At the same time, the portable scanning stick, together with the previous method of using a handheld PDA, provide customers with alternative solutions with different functions and different prices. The portable Bluetooth TPMS scanning stick includes a black-gray color and a red-black color casing. The main body thereof is made of high-strength engineering plastics, and part of the main body is designed with rubber coating to achieve a more comfortable feel. The overall length is about 50 cm, so that the portable Bluetooth TPMS scanning stick can be conveniently close to an inner tire in the two tires arranged side-by-side of the vehicle, facilitating activating the tire pressure monitoring device in the inner tire. The hardware circuit board arranged in the casing includes an MCU main control unit, an LF low-frequency transmission module, an RF transceiver integrated module, a low power consumption BLE Bluetooth module, a power charging control circuit unit, a key switch, a state indicator, a buzzer, and a vibration prompt unit. The scanning stick has a built-in rechargeable lithium polymer battery configured to charge the scanning stick through a USB port.

The portable Bluetooth TPMS scanning stick is characterized by that it can communicate with the tire pressure monitor attached to the tire through low frequency LF, so that the tire pressure monitor is activated to send out RF data, including the information of tire pressure, tire temperature, sensor ID and etc. Further, the RF receiving module in the Bluetooth TPMS scanning stick can receive the RF data sent by the tire pressure monitor, especially the ID of the sensor, i.e. the unique identification code of the entire life cycle of the tire, and send this unique identification code of the tire to the mobile phone APP through the Bluetooth module. The scanned data is uploaded to the cloud platform through GPRS communication in the mobile phone so as to dock the systems with the management background to achieve the data networking so that the Bluetooth TPMS scanning stick is used freely in various application scenarios. The Bluetooth scanning stick can also achieve the code scanning of various stages from warehouse management, the sales, the usage, the maintenance and the retreading until scrapping of the tire, and cooperate with the background management system to save and record data. Another main feature is that, the conventional bar codes can be scanned through the camera of a smart phone, and currently, scanning applications are still in use where tire bar codes are used for tire management. At the same time, the Bluetooth TPMS scanning stick can cooperate with the mobile phone APP for related communication operations. For example, clicking a "receiver" button on the APP to enter the receiver installing and uninstalling interface as shown in drawing, and then clicking the "receiver installing" to implement the communication with the smart master control receiver installed on the center console of the vehicle. The configuration information such as the model of the installed vehicle, the license plate number and the ID of the tire pressure monitoring device in each tire of the vehicle is written into the smart master control receiver, and then the master control receiver can receive the data of the pressure, temperature and etc. of the tire in real time when the vehicle is driving, and report the data to the background management platform through the GPRS module in real time. At the same time, some longer models of the vehicle, such as a semi-trailer, need to be equipped with repeaters to receive and forward the data of the tire pressure monitors installed in the last few axle tires.

The portable Bluetooth scanning stick has a low-frequency LF transmitting module, which can communicate with the tire pressure monitoring device attached to the crown inside the tire to achieve the activation of the tire pressure monitoring device, so that the tire pressure monitoring device can send the unique identity ID number for the entire life cycle management of the tire. The portable Bluetooth scanning stick has radio frequency RF receiving and transmitting functions, and thus can receive the radio frequency RF data, especially the unique identity ID number for the entire life cycle management of the tire, transmitted by the tire pressure monitoring device. The RF module integrated with RF transmitting and receiving functions of the portable Bluetooth scanning stick can achieve the radio frequency communication with the smart master control receiver in the present disclosure, achieve the binding between the smart master control receiver to the license plate number, and to the actual vehicle model as well to achieve the installation and configuration of the receiver on the vehicle, and write the configuration information of the ID of the tire pressure monitoring device in each tire in the vehicle and etc. into the smart master control receiver, so as to achieve the receiving of the sensor data in the vehicle by the smart master control receiver. The portable Bluetooth scanning stick can communicate with a repeater to achieve the installation of the repeater on a logistical trailer, as well as the tire pressure monitoring of longer vehicle models. Since the portable Bluetooth scanning stick has a built-in low power consumption BLE Bluetooth module, it can communicate with the mobile phone APP to implement the control of the Bluetooth scanning stick by various commands on the APP, and upload the data collected by the Bluetooth scanning stick to the mobile phone APP.

The present embodiment provides a tread depth ruler (the tire tread depth detection module) configured to automatically record and measure the tire tread depth in combination with the Bluetooth function of a mobile phone. The tread depth ruler is a dedicated tool for measuring the depth of the tire tread. By measuring the tire tread depth with the tread depth ruler, tire managers can acquire information regarding whether the tire exceeds a safety tread depth, wear condition, and etc.

By using the Bluetooth-based tire tread depth ruler and the mobile phone APP software, the measurement and automatic enter of the tread data during the routine tire inspections are achieved, thereby avoiding the data errors caused by manual entering, and improving the manual entering and on-paper recording functions of the existing tire management systems. The tread depth ruler includes a fixed part and a movable probe part, an LCD display module, a MCU, a low power consumption BLE Bluetooth module, a powered polymer battery unit, a key switch and a USB power charging port.

The tread depth ruler is powered by a polymer battery and has the USB charging socket configured to quickly charge the battery to ensure a longer use of the tread depth ruler. The tread depth ruler has the built-in low power consumption BLE Bluetooth module that supports Android system and IDS system. Through the module, the tread depth ruler can be connected to a mobile phone and an IPAD. The APP cooperating with the mobile phone may be an independent APP dedicated for measuring and displaying the data of the tread depth, or may be the tire management system APP of the present disclosure added with a function of a tread depth ruler. The data measured by the tread depth ruler is automatically displayed, recorded, and stored. The measured data is displayed on both the LCD side and the mobile phone APP side. The simultaneous display on both is more direct and clearer.

The present embodiment provides a cloud platform (the data management device) to store the information and data related to the tire, and uses front-end software to facilitate the effective and efficient entering and control of the tire states, as well as various data query operations. The cloud platform has the safe efficient, powerful and etc. characteristics.

Figure 12:
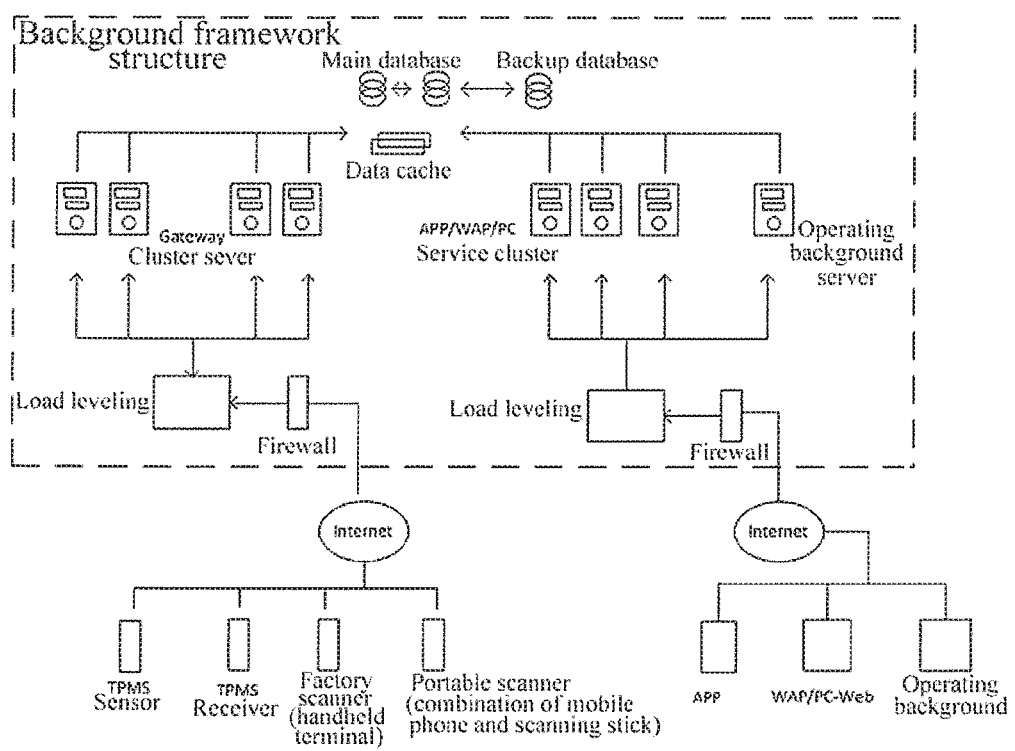
FIG. 12 is a schematic structural diagram showing the background framework of a data management device provided by another embodiment of the present disclosure.

FIG. 12 illustrates a diagram showing the background framework of the cloud platform. The background management framework includes a data exchange platform for managing hardware devices and a function service platform for supporting business. In an embodiment, the hardware device management platform (PaaS cloud) mainly has the following functions: sensor device access management mobile phone APP access management; device management: device virtualization and configuration management; data encryption communication: double authentication access, TLS and HTTPS communications, etc.; supporting access and management of millions of devices.

The main functions of the business function support platform (SaaS cloud) include: background supporting and managing functions; big-data analysis, data visualization, statistical reports; docking with third-party interfaces (such as ERP interfaces).

The Internet front-end software uses Solr/Elastic Search technology to achieve the powerful multi-dimensional information retrieval capabilities, which can achieve the remote control of hardware devices and support multi-platform management of hardware. A PC-side management background, mobile APP handheld management tools, WAP pages, etc. that can quickly and efficiently query various entered data information of the tire are included.

Through the mobile phone APP, convenient operations such as manual entering, updating and etc. can be performed, including: new tire management: tire warehousing, tire receiving; tire movement: installation, binding, uninstallation; tire processing: tire repair records, tire retreading records and tire scrapping records.

Figure 13:
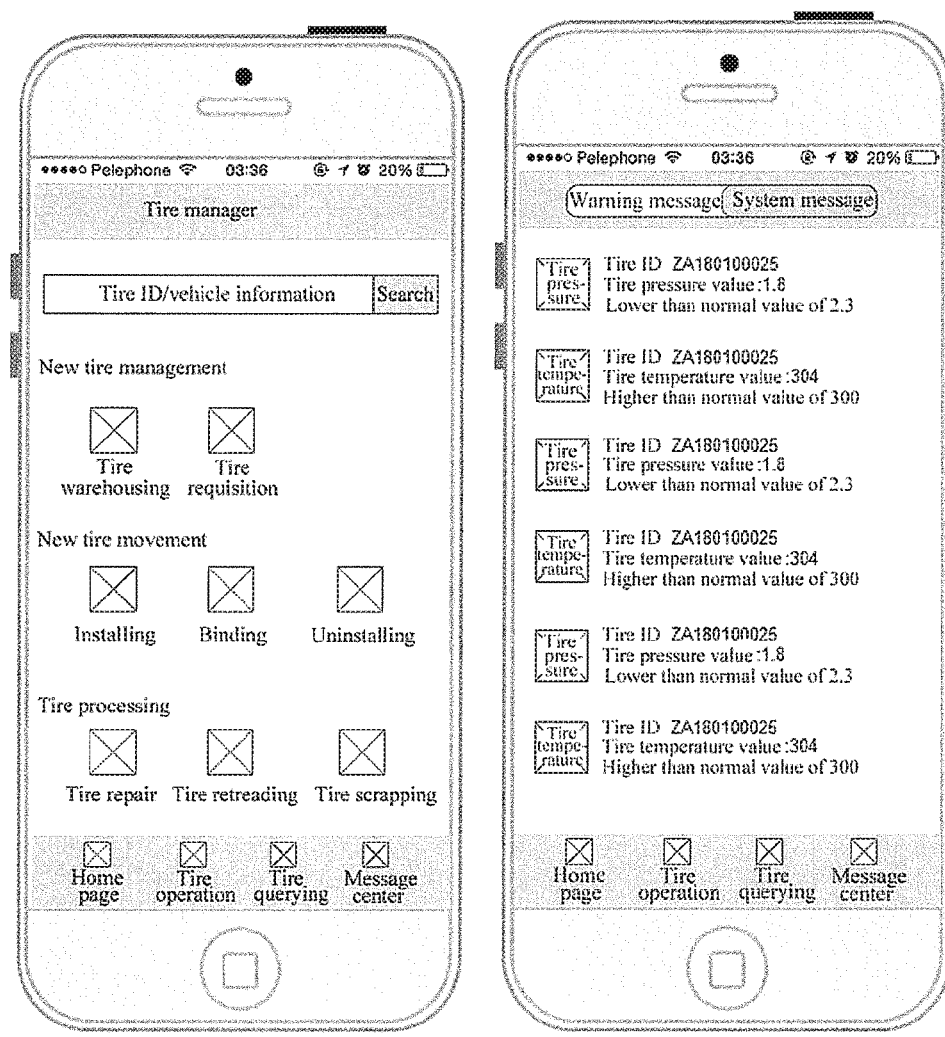
FIG. 13 is a schematic diagram of the tire information displayed by a mobile phone provided by another embodiment of the present disclosure.

At the same time, real-time tire warnings including tire pressure warning pushes; tire temperature warning pushes; system message pushes; efficient information queries; support of multi-dimensional information retrieval (to find tires according to the vehicle, to check tires according to the vehicle, etc.) can be achieved with mobile phones. The left diagram in FIG. 13 illustrates the page managing the tires displayed by an APP in a mobile phone. Through this page, information on the warehousing, requisition, installation, etc. of the tire can be acquired, and the acquired information is sent to the data management device. The right diagram in FIG. 13 illustrates the tire warning information. Based on the data collected from the data monitoring module, it is determined whether the collected data exceeds a normal value, and the corresponding warning information is displayed.

The front-end software for the fleet management has a more user-friendly information architecture. The front-end software adopts a three-level information architecture of fleet, vehicle, and tire; clusters information using information modules for a person to use more easily; supports multi-dimensional retrieval; and achieves the inquiry of the trail log, the transposition log and the repair day log of each tire for the powerful log function of the tire.

Figure 14:
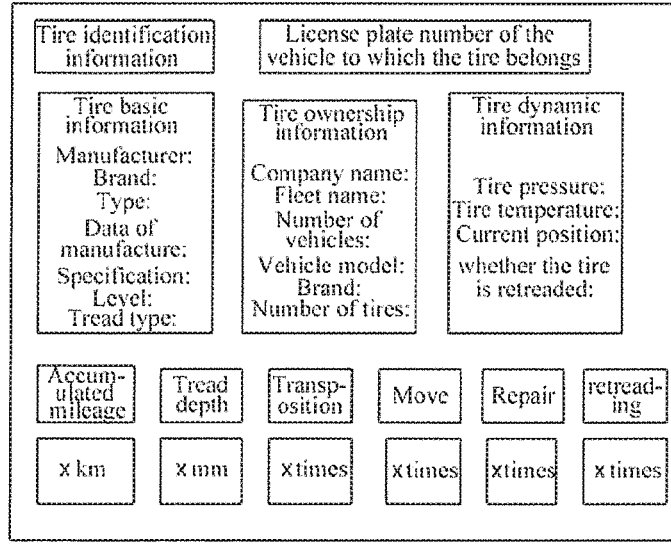
FIG. 14 is a schematic diagram of a queried information interface of the tire provided by another embodiment of the present disclosure.

For example, FIG. 14 illustrates a schematic diagram of an interface for querying the tire circulating records of a certain tire and the vehicle information of a vehicle on which the tire is installed. Through this interface, the vehicle to which the tire belongs, the number of tire repairs and retreading and etc. can be seen.

The front-end software has the characteristics of strong data visibility and a powerful report analysis function. The form of dashboard is adopted to make the data report more readable. The content supports a variety of report customization and analysis report output, as well as a variety of cross-analysis modes.

Figure 15:
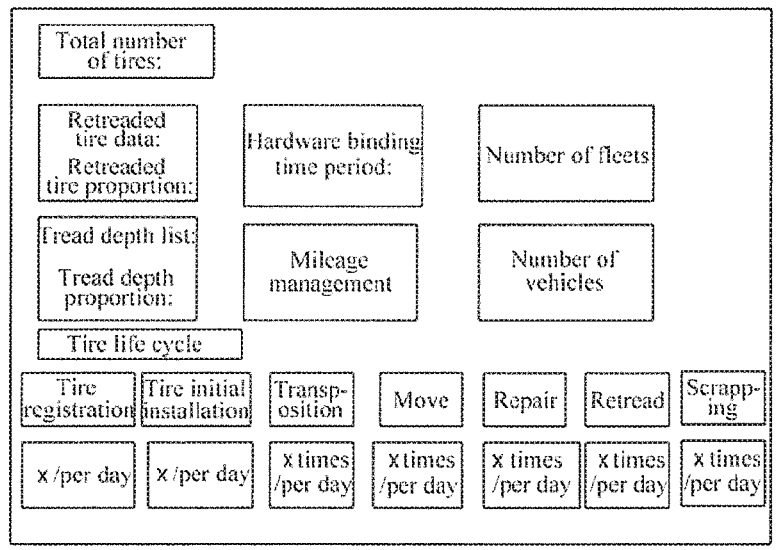
FIG. 15 is a schematic diagram of a queried interface of the tires of a plurality of vehicles provided by another embodiment of the present disclosure.

FIG. 15 illustrates a schematic interface view of the statistics of all tires. Through FIG. 15, the average number of the daily retreading and scrapping of all tires and the number of the fleets to which these tires belong can be acquired. The specific information is shown in FIG. 15.

Figure 16:
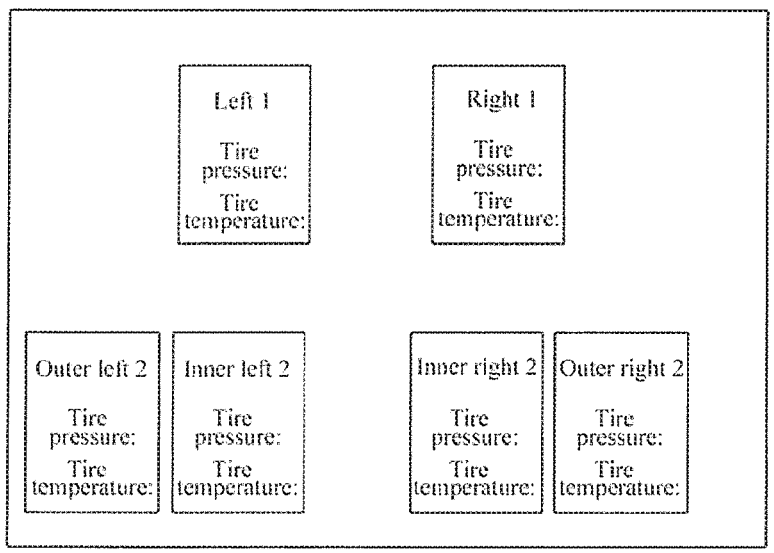
FIG. 16 is a schematic diagram of a displayed interface of the tire usage data provided by another embodiment of the present disclosure.

FIG. 16 illustrates a display diagram of the collected tire usage data, the diagram simulates the positional relations of the tires in a vehicle and directly illustrates the tire usage data and position of each tire. The tire position corresponding to left 1 is the left one of the front wheels of the vehicle; the tire position corresponding to right 1 is the right one of the front wheels of the vehicle. The corresponding tire positions on outer left 2 and inner left 2 are respectively the outer one and the inner one of the left tires in the rear wheels of the vehicle. The corresponding tire positions on outer right 2 and inner right 2 are respectively the outer one and the inner one of the right tires in the rear wheels of the vehicle.

It is not hard to understand that, the examples of the embodiments above are merely intended to facilitate a better understanding of the methods and devices provided by the embodiments of the present disclosure and are not intended to specifically limit the present disclosure. The various preferred embodiments described above do not affect each other, and the technical solutions obtained from any combination of the various preferred embodiments should be within the scope of the present disclosure.

The device embodiments described above are only illustrative, in which the units described as separate parts may or may not be physically separated, and the parts displayed as units may or may not be physical units, that is, they may be located in one place, or may also be distributed to multiple network units. According to actual needs, some or all of the modules may be selected to achieve the objectives of the solutions of the embodiments. Those of ordinary skill in the art can understand and implement without creative work.

Through the description of the embodiments above, those skilled in the art can clearly understand that each embodiment can be implemented by means of software with necessary universal hardware platform, and can also, of course, by means of hardware. Based on such understanding, the technical solutions of the present disclosure, or the part thereof contributing to the prior art, or parts thereof can be embodied in the form of a software product stored in a storage medium, such as ROM/RAM, magnetic disk, optical disk, etc., the software product includes certain instructions so that a computer device (may be a personal computer, a server, or a network device, etc.) performs the methods described by each of the embodiments, or some parts of the embodiments.

Finally, it should be noted that the embodiments above are only used to illustrate rather than to limit the technical solutions of the present disclosure; although the present disclosure has been described in detail with reference to the foregoing embodiments, those of ordinary skills in the art should understand that they can still modify the technical solutions described in the foregoing embodiments, or equivalently replace some of the technical features therein; and these modifications or replacements do not separate the essence of the corresponding technical solutions from the spirit and scope of the technical solutions of each of the embodiments of the present disclosure.

The invention claimed is:

1. A method for managing tire data, comprising:
receiving identification information for identifying a tire and tire usage data of the tire; and
establishing and storing a first mapping relation between the identification information and the tire usage data,
wherein the tire usage data includes a tire pressure, a tire temperature, and an accumulated driving mileage of the tire,
and further comprising:
receiving tire circulating records of the tire and establishing and storing a second mapping relation between the identification information and the tire circulating records.

2. The method of claim 1,
wherein the tire circulating records include warehousing information, requisition information, installation information, repair records, inspection and maintenance information, retreading records, and scrapping records of the tire.

3. The method of claim 2, further comprising:
receiving vehicle information of a vehicle to which the tire belongs, establishing and storing a third mapping relation between the identification information and the vehicle information,
wherein the vehicle information includes a model of the vehicle, a license plate number, personal information of an owner of the vehicle, further wherein the vehicle information includes fleet information of a fleet to which the vehicle belongs, and information regarding an installation position of the tire on the vehicle; further wherein the fleet information comprises a name of the fleet.

4. The method of claim 3, further comprising:
receiving the identification information and an instruction for querying tire information of the tire corresponding to the identification information; and
sending the tire information having the third mapping relation with the identification information,
wherein, the tire information comprises at least one of the tire usage data, the tire circulating records and the vehicle information.

5. The method of claim 4, further comprising:
receiving the license plate number of the vehicle, and an instruction for querying tire information of all tires of the vehicle corresponding to the license plate number; and
the tire information of all tires belonging to the vehicle corresponding to the license plate number.

6. The method of claim 5, further comprising:
receiving the name of the fleet, and an instruction for querying tire information of the tires of all vehicles belonging to the fleet;
sending the tire information of all tires of the vehicles belonging to the fleet.

7. An electronic device, comprising:
at least one processor; and
at least one non-transitory memory in communication with the processor, wherein the memory stores program instructions executable by the processor, the processor calls the program instructions to execute the method of claim 1.

8. A non-transitory computer readable storage medium, wherein the non-transitory computer readable storage medium stores computer programs that enable a computer to execute the method of claim 1.

9. The method of claim 1, wherein the tire circulating records include at least one of warehousing information, requisition information, installation information, repair records, inspection and maintenance information, retreading records, and scrapping records of the tire.

10. A device for managing tire data, comprising:

a receiving module comprising data-reception electronics configured to receive identification information for identifying a tire and tire usage data of the tire; and a storage module comprising a processor and a memory configured to establish and store a mapping relation between the identification information and the tire usage data and between the identification information and tire circulating records, wherein the tire usage data comprises one of a tire pressure, a tire temperature, and an accumulated driving mileage of the tire.

11. A method for managing tire data, comprising:

receiving identification information for identifying a tire and tire usage data of the tire; and establishing and storing a first mapping relation between the identification information and the tire usage data, wherein the tire usage data includes a tire pressure, a tire temperature, and an accumulated driving mileage of the tire, further comprising receiving vehicle information of a vehicle to which the tire belongs, establishing and storing a second mapping relation between the identification information and the vehicle information, wherein the vehicle information includes a model of the vehicle, a license plate number, personal information of an owner, further wherein the vehicle information includes fleet information of a fleet to which the vehicle belongs, and information regarding an installation position of the tire on the vehicle; further wherein the fleet information comprises a name of the fleet.

* * * * *